(12) United States Patent
Brun

(10) Patent No.: US 6,181,856 B1
(45) Date of Patent: Jan. 30, 2001

(54) METHOD AND APPARATUS FOR ALIGNING OPTICAL WAVEGUIDE ARRAYS

(75) Inventor: Mark G. Brun, Avon (FR)

(73) Assignee: Corning Incorporated, Corning, NY (US)

(*) Notice: Under 35 U.S.C. 154(b), the term of this patent shall be extended for 0 days.

(21) Appl. No.: 09/321,017

(22) Filed: May 27, 1999

(30) Foreign Application Priority Data

May 27, 1998 (EP) .................................................. 98401251

(51) Int. Cl.[7] .................................................. G02B 6/26
(52) U.S. Cl. .............................. 385/52; 385/49; 385/90; 385/88; 385/89; 385/14
(58) Field of Search .................................. 385/49, 50, 52, 385/88, 89, 14, 31, 90, 91, 92, 147

(56) References Cited

U.S. PATENT DOCUMENTS

| 4,372,768 | * | 2/1983 | Zucker et al. | 65/385 X |
| 4,746,195 | * | 5/1988 | Auracher et al. | 385/52 X |
| 4,798,442 | * | 1/1989 | Feilhauer et al. | 385/52 X |
| 5,117,474 | * | 5/1992 | van den Bergh et al. | 385/39 |
| 5,135,590 | * | 8/1992 | Basavanhally et al. | 385/52 X |
| 5,185,846 | * | 2/1993 | Basavanhally et al. | 385/137 |
| 5,281,301 | * | 1/1994 | Basavanhally | 385/52 X |
| 5,559,915 | | 9/1996 | Deveau | 385/49 |

FOREIGN PATENT DOCUMENTS

WO 96/07118    3/1996 (WO) .................................. 385/52 X

* cited by examiner

Primary Examiner—Brian Healy
(74) Attorney, Agent, or Firm—Philip G. Alden

(57) ABSTRACT

A method and apparatus for providing an improved coupling between waveguides of an integrated optical waveguide circuit component and waveguides of an optical fiber array. The circuit component and optical fiber array are aligned and adjusted relative to each other while sensing the total optical power outputted from all of the optical fibers of the array. An integrating sphere is utilized to sum the individual optical power outputs of all of the optical fibers and an autoalignment system is used to adjust the relevant position of the component and the fiber array to maximize the total optical power outputted from the fibers into the integrating sphere.

24 Claims, 4 Drawing Sheets

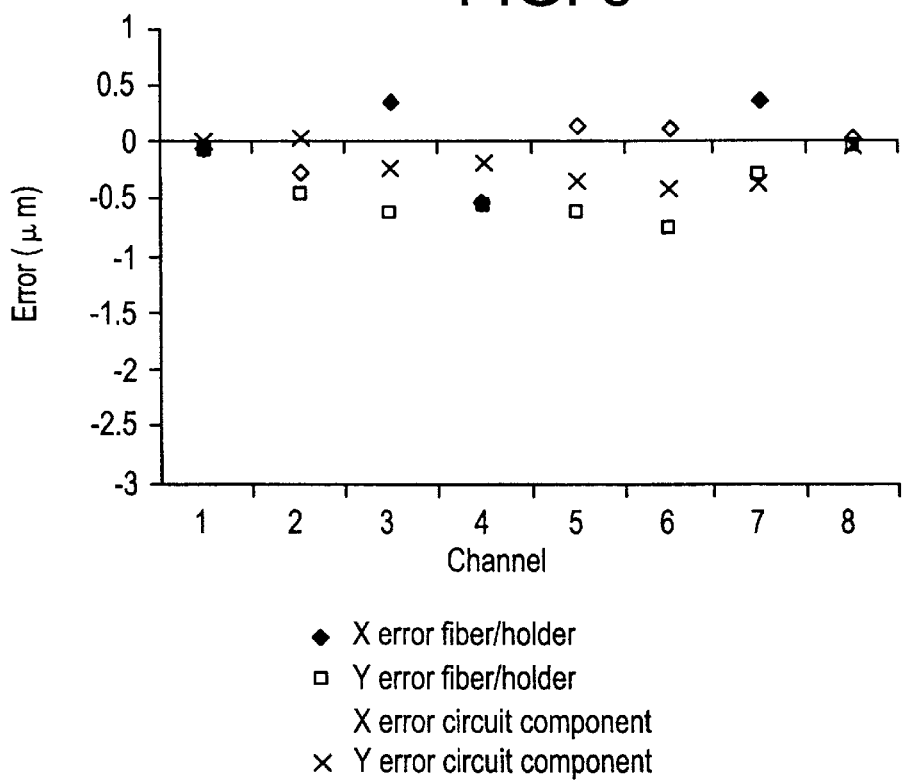
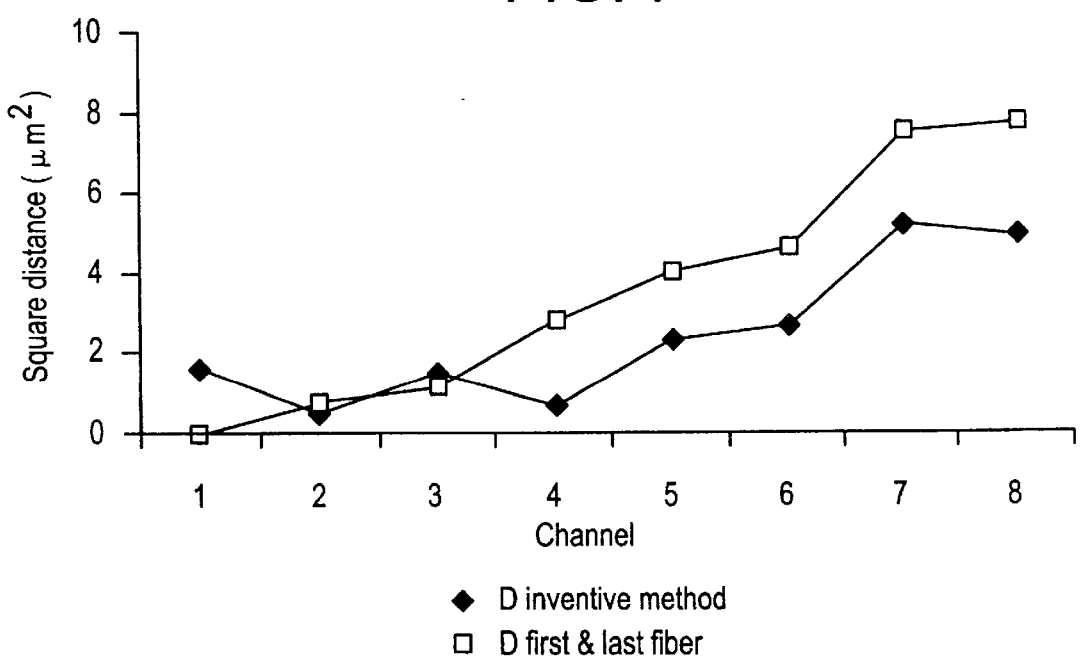

METHOD AND APPARATUS FOR ALIGNING OPTICAL WAVEGUIDE ARRAYS

FIELD OF INVENTION

The present invention relates to a method of aligning optical waveguide arrays. Such a method comprises monitoring the total optical power coupled from the optical waveguides of a first array into the optical waveguides of a second array. The invention is especially suited for aligning, coupling and connecting an integrated optical waveguide circuit component to an array of optical fibers held in an optical fiber array holder.

BACKGROUND OF THE INVENTION

Integrated optical waveguide circuit devices, such as planar waveguides, lightwave optical circuits, and optical devices on planar glass and semiconductor substrates are becoming increasingly important in multi-wavelength transmissions systems, fiber-to-the-home, and optical telecommunications systems.

To function, a light guiding waveguide region in the optical device must be interconnected or pigtailed with a light guiding waveguide region in an optical fiber or another optical device. The interconnection requires low loss, typically less than 0.2 db per connection, environmental reliability against heat and humidity, and cost effectiveness. Achieving a low loss connection requires extremely high precision alignment of the light guiding waveguide regions.

One way to align the waveguide region in planar optical devices with the light guiding region in an optical fiber is by active alignment, wherein the waveguide regions are butted together, the alignment is monitored with an optical monitoring tool, and the abutting waveguide regions are then secured together.

Another approach is passive alignment, which involves aligning the waveguide regions by mechanical means. For example, a planar optical device may be aligned with an array of fibers or another planar device by using a pair of MT type connector devices, fabricated by forming V-grooves on a silicon wafer which support a planar waveguide surrounded by a plastic molded MT type connector plug. The V-grooves are precisely located on the wafer, and the V-grooves support guide pins. The guide pins are positioned to be received by guide holes on an oppositely disposed MT-type connector plug which contains an array of optical fibers. Connection of the two plug ends passively aligns the planar waveguide and the array of fibers. Such prior methods do not provide an economic means to precisely align arrays of optical waveguides with optimized optical coupling.

SUMMARY OF THE INVENTION

Accordingly, the present invention is directed to a method of aligning and connecting a first array of optical waveguides to a second corresponding array of optical waveguides and an apparatus for coupling such waveguide arrays that substantially obviates one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the apparatus, process, and compositions particularly pointed out in the written description and claims hereof as well as the drawings.

To achieve these and other advantages and in accordance with the purpose of the invention, as embodied and broadly described, the invention comprises a method of connecting an integrated optical waveguide circuit component to an optical fiber array, which includes the steps of providing an integrated optical waveguide circuit component having an array of N wave guide ports, providing an optical fiber array having an array of N optical fibers, and positioning the optical fiber array adjacent to the circuit component so that photons emitted from waveguide ports are coupled into the respective individual corresponding optical fiber coupling ends of the optical fiber array. The method further includes positioning the optical distal fiber terminal ends of the N optical fibers of the optical fiber array adjacent to the input of an optical power collection and concentrating member which collects the photons that exit the distal terminal ends and concentrates the photons on an optical power sensor and sensing the value representative of the total optical power of the photons concentrated on the optical power sensor that have been emitted from the waveguide ports and coupled into the respective individual corresponding optical fiber coupling ends and exited from the distal terminal ends of the optical fibers. The method further includes adjusting the relevant position of the optical fiber array to the circuit component so that the sensed value representative of the total optical power of the photons is maximized and securing this position of the optical fiber array to the circuit component when the sensed value representative of the total optical power is at a maximum.

In another aspect, the invention includes an apparatus for coupling an integrated optical waveguide circuit component with a multiple fiber fiber array to provide an optimized optical power coupling between the circuit component and a coupling end of the fiber array with the fiber array terminating with a terminal end distal from the coupling end. The apparatus includes an autoalignment system for controlling and adjusting the relevant position of the coupling end of the fiber array to that of the circuit component, and an integrating sphere positioned proximate the autoalignment system. The integrating sphere includes at least one input port and an optical power sensor that is connected to an input of the autoalignment system wherein the terminal end of the fiber array is inputted into the input port of the integrating sphere such that light emitted from a circuit component received by the autoalignment system is coupled into the fiber array at the fiber coupling end and emitted from the fiber array terminal end and into the integrating sphere and the total optical power emitted from the fiber array terminal ends is sensed by the optical power sensor which inputs the sensed total optical power into the input of the autoalignment system, and the autoalignment system repeatedly adjusts the relevant position of the coupling end of the fiber array to that of the circuit component to obtain the maximum total optical power sensed by the optical power sensor.

In an additional aspect, the invention comprises a method of aligning a plurality of first optical fiber ends of an optical fiber array held in an optical fiber array holder with a plurality of optical waveguide interface ports of an integrated optical waveguide circuit component. The method includes abutting the first optical fiber ends to the optical waveguide interface ports and connecting an energy source to the integrated optical waveguide circuit so that light is emitted from the interface ports into the first optical fiber ends abutting the optical waveguide interface ports. The optical fiber array includes a plurality of optical fibers which terminate with a plurality of terminal distal second ends that are distal from the first ends. The method further includes inserting the terminal distal second ends into an integrating sphere so that the light emitted from the plurality of terminal distal second ends is collected and spatially integrated and sensing the total optical power of the collected and spatially integrated light emitted from the plurality of terminal distal second ends inserted into the integrating sphere. The method further includes adjusting the relative physical relationship of the plurality of optical waveguide interface ports to the first optical fiber ends abutting the optical waveguide interface ports in order to maximize the sensed total optical power of the collected and spatially integrated light emitted from the plurality of terminal distal second ends inserted into the integrating sphere.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate embodiments of the invention and, together with the description, serve to explain the principles of the invention.

BRIEF DESCRIPTION OF DRAWINGS

FIG. 6 is a plot of error (Tm) for channels 1–8.

FIG. 7 is plot of square distance (Tm$^2$) for channels 1–8.

DETAILED DESCRIPTION

The invention comprises a method of aligning a first array of optical waveguides with a second array of optical waveguides wherein the total optical power outputted from all of the optical waveguides of the second array is maximized.

The invention includes a method of connecting an integrated optical waveguide circuit component with an optical fiber array which includes the step of providing an integrated optical waveguide circuit component having an array of N optical waveguide ports.

Reference will now be made in detail to the present preferred embodiments of the invention, examples of which are illustrated in the accompanying drawings.

An exemplary embodiment of the method of the present invention is shown in FIGS. 1–4.

Figure 1:
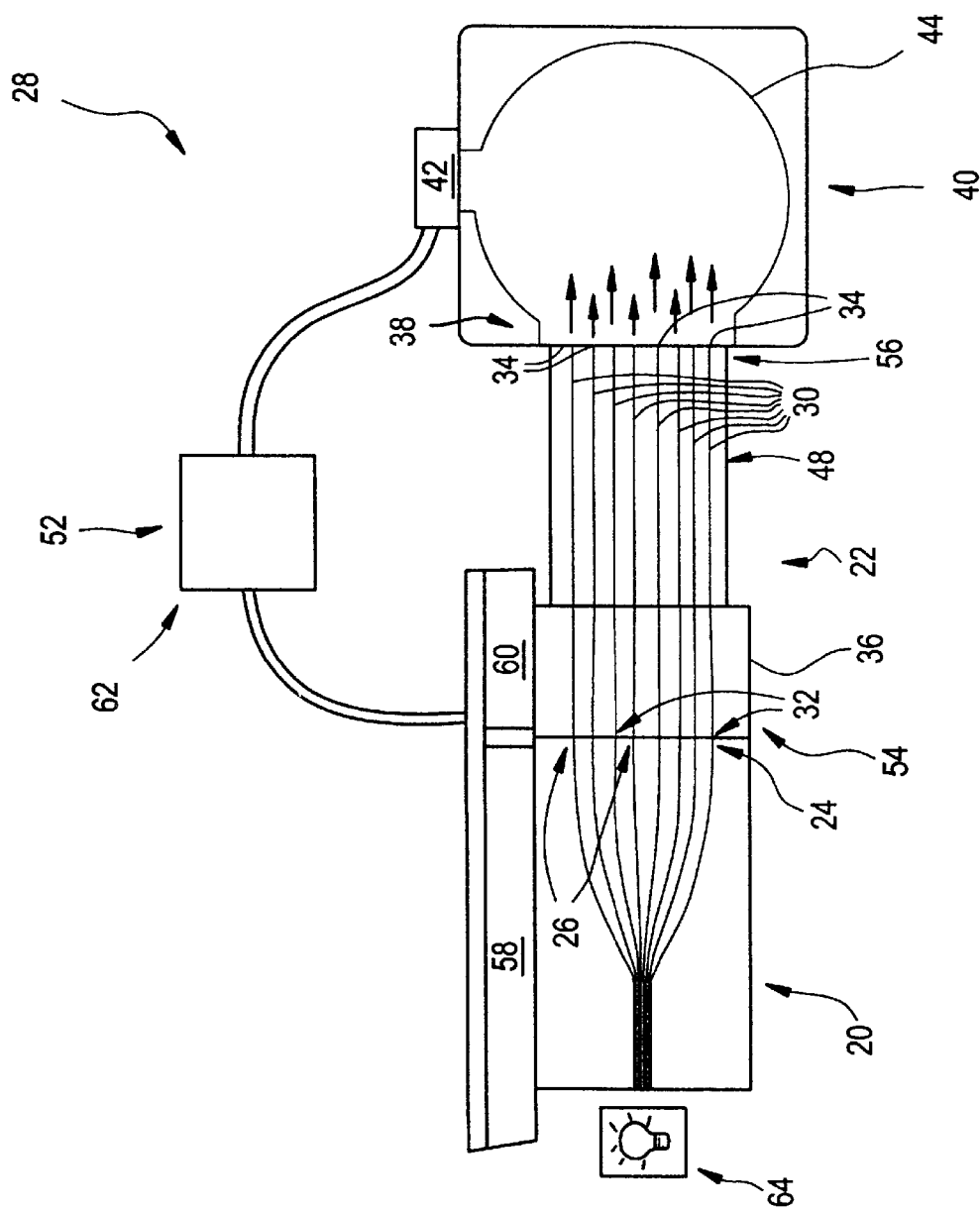
FIG. 1 is a view of a device, method and system in which the present invention is embodied.
Figure 2:
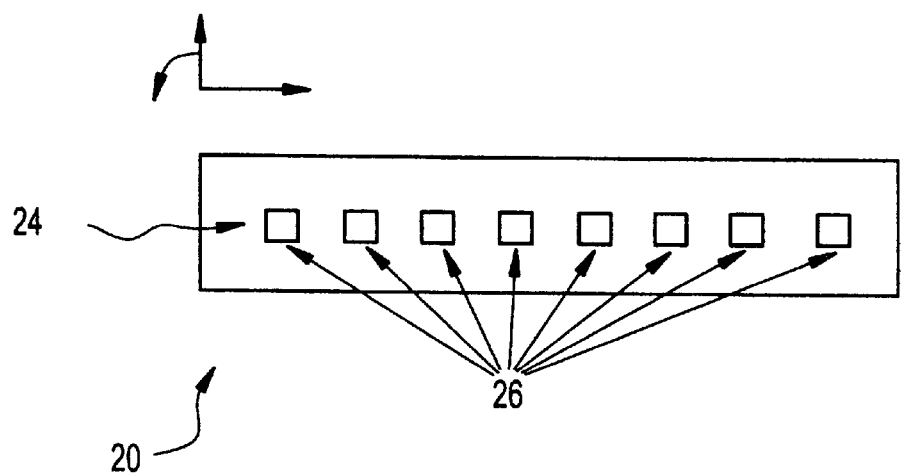
FIG. 2 is an end view of a component shown in FIG. 1.

As embodied herein and referring to FIG. 1, the method of connecting an integrated optical waveguide circuit component 20 with an optical fiber array 22 includes the step of providing integrated optical waveguide circuit component 20 having an array 24 of N waveguide ports 26 as shown in FIG. 2. Preferably array 24 of waveguide ports 26 is substantially linear, with waveguide ports spaced apart and oriented in a regulated and standardized manner.

Figure 3:
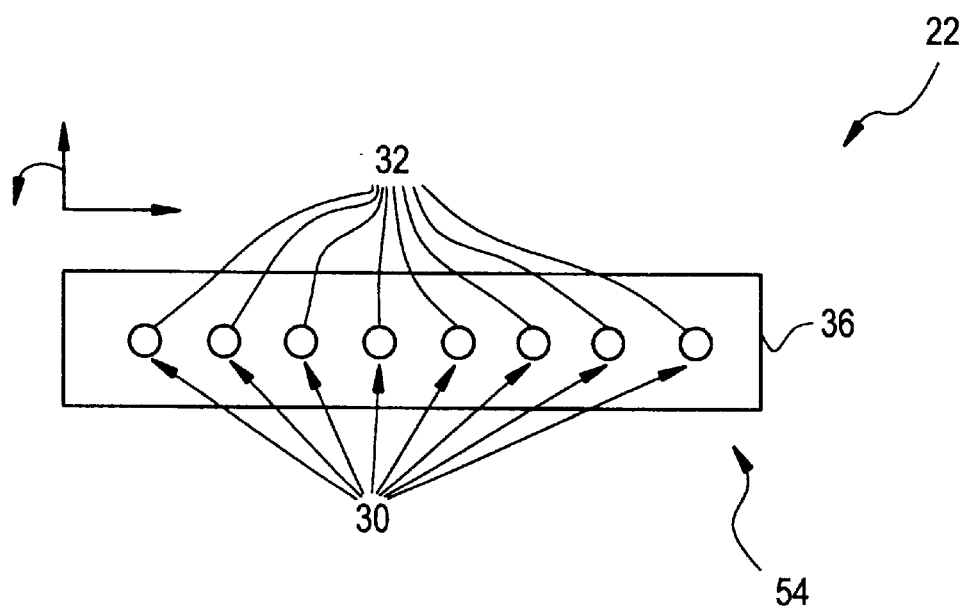
FIG. 3 is an end view of a component shown in FIG. 1.
Figure 4:
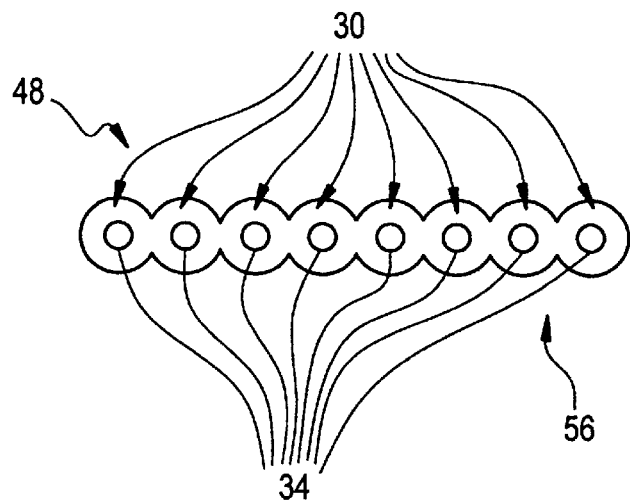
FIG. 4 is an end view of a component shown in FIG. 1.

The method further includes providing optical fiber array 22 having an array of N optical fibers 30, with each of the optical fibers 30 having a coupling end 32, as shown in FIG. 3, for optical coupling to a respective individual corresponding waveguide port 26 of circuit component 20, with each of the N optical fibers 30 terminating with an individual optical fiber terminal end 34 as shown in FIG. 4. Preferably optical fiber coupling ends 32 are in substantially linear array, with coupling ends 32 spaced apart and oriented in a regulated and standardized manner which corresponds with and matches that of array 24 of waveguide ports 26, such can be obtained by holding the coupling end area of optical fiber array 22 with an optical fiber array holder 36, such as a fiber array holder block that utilizes V-grooves. Preferably optical fibers 30 are single mode optical fibers.

The method further includes positioning optical fiber array 22 adjacent to circuit component 20 so that photons emitted from waveguide ports 26 of circuit component 20 are coupled into the respective individual corresponding optical fiber coupling ends 32 of optical fiber array 22.

The method further includes positioning the N optical fiber terminal ends 34, of the optical fibers 30 of the optical fiber array 22, adjacent to an input 38 of an optical power collection and concentrating member 40 which collects photons that exit the terminal ends 34 of N optical fibers 30 and concentrate the photons on an optical power sensor 42. Preferably optical power collection and concentrating member 40 is a reflective member such as an integrating sphere which reflectively and optically collects and concentrates the exiting photons which exit terminal ends 34 at a variety of angles and directions. Preferably integrating sphere 44 has a reflectance of at least 98% for the 1300 nm to 1600 nm wavelength range. Integrating sphere 44 is optically designed to sum together the individual optical power emitted from the individual terminal ends 34 of the individual optical fibers 30 of optical fiber array 22 to provide a total optical power. Preferably terminal ends 34 are inserted into the interior of integrating sphere 44.

The method further includes sensing a value representative of the total optical power of the photons concentrated on optical power sensor 42, with such photons having been emitted from waveguide ports 26 and coupled into respective individual corresponding optical fiber coupling ends 32 and exited for the terminal ends 34 of optical fibers 30.

The method further includes adjusting the relevant position of optical fiber array 22 to circuit component 20 so that the sensed value representative of the total optical power of the exited photons is maximized and then securing this position of the optical fiber array 22 to circuit component 20.

Preferably optical power collection and concentrating member 40 is a reflective optical power collection and concentrating member, and most preferably is an integrating sphere 44.

Providing optical fiber array 22 includes providing an optical fiber array held in an optical fiber array holder 36 wherein coupling ends 32 of optical fibers 30 are contained by optical fiber array holder 36 which is designed to match the spacing, placement and orientation of respective waveguide ports 26 of waveguide port array 24. Optical fiber array holder 36 may comprise V-grooves that are precision formed such as by machining or like methods, with optical fibers 30 contained within the V-grooves. Optical fiber array 22 is preferably comprised of an optical fiber array ribbon 48, wherein optical fiber array ribbon 48 flexibly constrains optical fibers 30, and optical fiber terminal ends 34 are contained by ribbon 48. Preferably the terminal end of optical fiber array ribbon 48 is cleaved and provided such that optical fiber terminal ends 34 are still coated and unstripped fiber ends, such as can be provided by mass cleaving of fiber array ribbon 48.

Preferably the step of securing the position of optical fiber array 22 to circuit component 20 comprises adhering optical fiber array holder 36 to circuit component 20 so that the maximized sensed value of total optical power is maintained. Adhering can be achieved with an epoxy, glue, or other adhering compositions.

As shown in FIGS. 1–4, with N being the number of optical waveguide ports 26 or optical fibers 30, preferably N is at least four, and most preferably at least eight. Circuit component 20 can comprise a 1×8 splitter/combiner as shown in FIG. 1, and which has eight optical waveguide ports 26. Circuit component 20 preferably comprises a planar substrate, such as a silica or silicon substrate which provides a support and platform for the optical waveguides that make up the integrated optical circuit of the component. Circuit component 20 may be comprised of a wavelength division multiplexer/demultiplexer, for example a wavelength division demultiplexer which separates an incoming signal comprised of eight different wavelength channels into the eight different wavelength channels.

Figure 5:
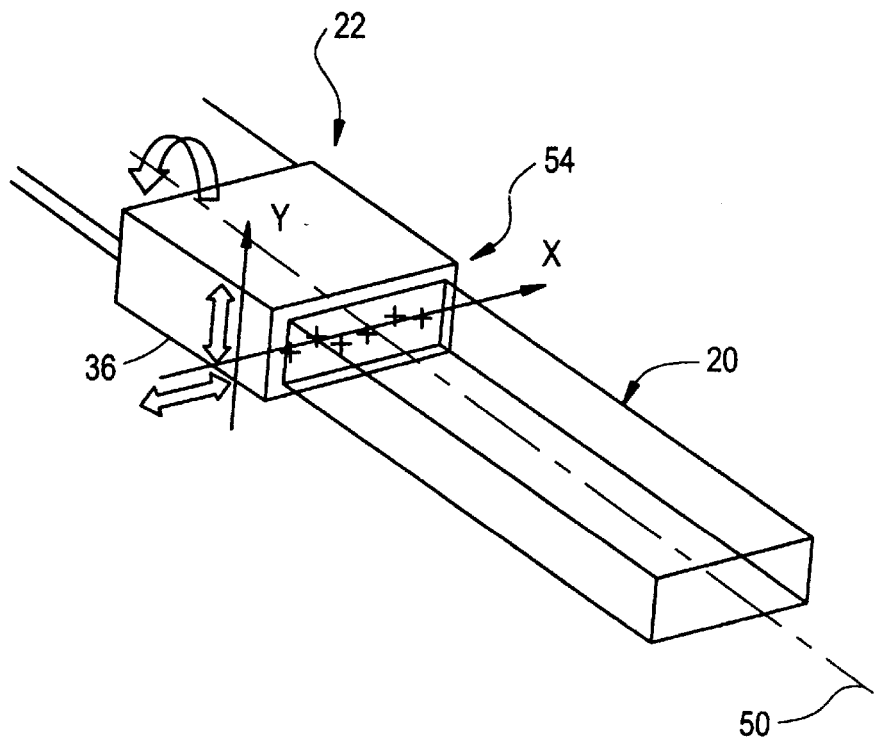
FIG. 5 is a perspective view of a device and method in which the present invention is embodied.

As shown in FIG. 5, preferably the step of adjusting the relevant position of circuit component 20 to optical fiber array 22 includes adjusting the relevant position in two translations, such as x and y, and one rotation about a longitudinal axis 50 that is normal to the x-y plane. Preferably the relevant position of optical fiber array 22 to circuit component 20 is adjusted with an electrically controlled autoalignment system such as an electromechanical autoalignment system. Preferably the sensed value representative of the total optical power is inputted into autoalignment system 52, and autoalignment system 52 adjusts the relevant position of optical fiber array 22 to circuit component 20 in at least two translations and at least one rotation based on the sensed value representative of the total optical power that is inputted into the autoalignment system.

The invention further includes an apparatus 28 for coupling an integrated optical waveguide circuit component 20 with a multiple fiber fiber array 22 to provide an optimized optical power coupling between the circuit component 20 and a coupling end 54 of fiber array 22 with the fiber array 22 terminating with a terminal end 56 distal from coupling end 54. Apparatus 28 includes an autoalignment system 52. Autoalignment system 52 is comprised of a circuit component receiving platform 58 for receiving circuit component 20 and a fiber array coupling end receiving platform 60 for receiving coupling end 54 of fiber array 22. Autoalignment system 52 includes a position controller 62 for controlling and adjusting the relevant position of fiber array coupling end 54 received by fiber array coupling end receiving platform 60 to that of circuit component 20 received by the circuit component receiving platform 58.

Apparatus 28 includes an integrating sphere 44 positioned proximate autoalignment system 52. Integrating sphere 44 has at least one input port 38 and an optical power sensor 42. Optical power sensor 42 is connected to an input of position controller 62.

Apparatus 28 is adapted to receive a fiber array 22 having a coupling end 54 and a terminal distal end 56 distal from coupling end 54, such that coupling end 54 is received by fiber array coupling end receiving platform 60 and terminal end 56 is inputted into input port 38 of integrating sphere 44. Apparatus 28 is adapted such that light emitted from circuit component 20 received by circuit component receiving platform 58 is coupled into fiber array 22 at fiber coupling end 54 and the light coupled into the fiber array is emitted from the fiber array terminal end 56 and into integrating sphere 44. The total optical power emitted form fiber array terminal end 56 is sensed by optical power sensor 42.

Optical power sensor 42 inputs the sensed total optical power into the input of position controller 62. Position controller 62 repeatedly adjusts the relevant position of coupling end 54 of fiber array 22 to that of circuit component 20 to obtain a maximum total optical power sensed by optical power sensor 42.

Integrating sphere 44 preferably has an input port 38 sized such that a fiber array terminal end 56 comprised of at least four optical fibers can be inserted into integrating sphere 44. Most preferably input port 38 has a size such that at least eight optical fiber terminal ends may be inserted into integrating sphere 44.

Autoalignment system 52 abuts fiber array coupling end 54 against circuit component 20 and translates fiber array coupling end 54 in at least an x and a y direction and at least one rotation as shown in FIG. 5. Preferably the orientation and placement of circuit component 20 is fixed and fiber array coupling end 54 is moved relative to circuit component 20 and its waveguide ports 26. In addition apparatus 28 includes an optical light source 64 that provides a light source for circuit component 20.

The invention further comprises a method of aligning a plurality of first optical fiber ends 32 of an optical fiber array 22 held in optical fiber array holder 36 with a plurality of optical waveguide interface ports 26 of an integrated optical waveguide circuit component 20. The method includes abutting the plurality of first optical fiber ends 32 of the optical fiber array 22 held in optical fiber array holder 36 to the plurality of optical waveguide interface ports 26 of integrated optical waveguide circuit component 20.

The method includes the step of connecting optical light energy source 64 to integrated optical waveguide circuit 20 so that light is emitted from the optical waveguide interface ports 26 into the first optical fiber ends 32 abutting the interface ports 26.

Optical fiber array 22 includes a plurality of optical fibers 30 which terminate with terminal distal second ends 34 which are distal from first ends 32. The method includes inserting the plurality of terminal distal second ends 34 into an integrating sphere 44 so that the light emitted from the terminal distal second ends 34 is collected and spatially integrated. The method further includes sensing the total optical power of the collected and spatially integrated light emitted form terminal distal second ends 34 inserted into integrating sphere 44. The method includes the step of adjusting the relative physical relationship of optical waveguide interface ports 26 to first optical fiber ends 32 abutting interface ports 26 in order to maximize the sensed total optical power of the collected and spatially integrated light emitted from terminal distal second ends 34 inserted into integrating sphere 44.

The plurality of optical waveguide interface ports 26 of integrated optical waveguide circuit component 20 includes an interface port array comprised of at least a first waveguide interface port, a second waveguide interface port, a third waveguide interface port, a fourth waveguide interface port, a fifth waveguide interface port, a sixth waveguide interface port, a seventh waveguide interface port and an eighth waveguide interface port. The first optical fiber ends 32 of optical fiber array 22 held in optical fiber array holder 36 includes a respective matching array comprised of at least a first matching first optical fiber end, a second matching first optical fiber end, a third matching first optical fiber end, a fourth matching first optical fiber end, a fifth matching first optical fiber end, a sixth matching first optical fiber end, a seventh matching first optical fiber end and an eighth matching first optical fiber end, which respectively correspond and match waveguide interface ports 26. Optical fiber array 22 is comprised of at least a first optical fiber which terminates with a first terminal distal second end, a second optical fiber which terminates with a second terminal distal second end, a third optical fiber which terminates with a third terminal distal second end, a fourth optical fiber which terminates with a fourth terminal distal second end, a fifth optical fiber which terminates with a fifth terminal distal second end, a sixth optical fiber which terminates with a sixth terminal distal second end, a seventh optical fiber which terminates with a seventh terminal distal second end and an eighth optical fiber which terminates with a eighth terminal distal second end. Preferably sensing the total optical power of the collected and spatially integrated light emitted from the plurality of terminal distal second ends 34 inserted into integrating sphere 44 includes sensing the total optical power of the collected and spatially integrated light emitted from the first terminal distal second end, the second terminal distal second end, the third terminal distal second end, the fourth terminal distal second end, the fifth terminal distal second end, the sixth terminal distal second end, the seventh terminal distal second end and the eighth terminal distal second end.

The inventive active alignment method and apparatus system provide a gain in precision of alignment and takes the uncertainties of the fiber arrays and integrated optical waveguide circuit components into account without a need to characterize the individual spacing, placement, orientation, and other characteristics of interface waveguide ports 26 and optical fiber coupling ends 32. The invention is also advantageous in economic terms in that an array of eight waveguide ports 26 can be aligned with an eight fiber fiber array 22 providing an optimized maximum optical power coupling in less than 30 seconds.

In practicing the invention a single mode splitter/coupler circuit component 20 was aligned, coupled and connected to an array 22 of eight single mode optical fibers held in a V-grooved precision block optical fiber array holder 36. An autoalignment system 52 was used to adjust and manipulate the relative physical position of waveguide port array 24 to optical fiber coupling ends 32. 1×8 splitter/coupler circuit component 20 was fixed as shown in FIG. 5 and optical fiber array 22 was translated in the x and y direction and rotated along an axis 50 normal to the x-y plane. An example 30 of such an autoalignment system 52 is the Newport AutoAlign™ System available from Newport Corporation, 1791 Deere Avenue, Irvine, Calif. 92606, U.S.A. Terminal ends 34 of optical fiber array optical fiber ribbon 48 were inserted into integrating sphere 44, such as a Model 818-IS-1 available from Newport Corporation, 1791 Deere Avenue, Irvine, Calif. 92606, U.S.A. Terminal ends 34 were obtained by mass cleaving of optical fiber ribbon 48. The terminal ends 34 were not stripped of their protective fiber coatings and ribbon coatings. The value representative of the total optical power sensed by a sensor 42 was inputted into the algorithms that control the autoalignment optimization of autoalignment system 52.

The optical power coupled from circuit component 20 and into optical fiber array 22 is inversely proportional to the misalignment of each individual waveguide port 26 to its respective matching and corresponding optical fiber coupling end 32, and depends on the positioning error of waveguide port 26 and the optical fiber cores of optical fiber coupling ends 32. Such positioning error will always be present and depends on the process noise in the manufacturing processes of the circuit components and the optical fiber arrays, with variations between individual pieces.

FIG. 6 shows the error data of eight single mode fiber cores coupled to the waveguide ports of the 1×8 splitter/coupler circuit component. FIG. 6 is a plot of x-y error [Error (Tm)] on position of optical fiber coupling ends 32 held in optical fiber array holder 36 and the waveguide ports 26 of circuit component 20 versus channel, wherein channel represents the eight optical power channels guided by circuit component 20 and that are outputted or inputted into the respective eight waveguide ports 26, in this case outputted from the eight waveguide ports 26 and inputted into the eight optical fiber coupling ends 32. The optical power channel of the eight waveguide ports 26 are designated as 1,2,3,4,5,6,7 and 8.

The invention uses the total sum of each of the individual power channels together for finding the optimal position of fiber array 22 in front of circuit component 20, instead of using the optical power of individual power channels, such as the first and last fiber in the array. The assumption is made that this sum varies as a linear combination of the misalignment error, and that a geometrical modeling can be established to quantify the gain of the inventive method in terms of alignment precision.

Considering the sum square error distance for each channel as the criterion to minimize:

$$S = \sum_{i=0}^{n-1} d_i^2 = \sum_{i=0}^{n-1} \left[ (\delta_X^i)^2 + (\delta_Y^i)^2 + (\mu_X^i)^2 + (\mu_Y^i)^2 \right]$$

where n is the number of channels, $\delta_x^i$ (resp. $\mu_x^i$) et $\delta_y^i$ (resp. $\mu_y^i$) are the i error in X and Y direction of the circuit component (resp. the fiber array).

A line (D)

$$\begin{cases} X_0 + t \cdot \cos a \\ Y_- + t \cdot \sin a \end{cases}$$ is provided and her associated transfer matrix $$P = \begin{bmatrix} \cos a & \sin a \\ -\sin a & \cos a \end{bmatrix}$$

In this new basis, one can solve the following linear system to find the line D which has S becoming minimum.

$$\begin{cases} \frac{\partial S}{\partial X_0} = 0 \\ \frac{\partial S}{\partial Y_0} = 0 \\ \frac{\partial S}{\partial a} = 0 \end{cases}$$

and $S \geq 0$

In FIG. 7, the plot of square error distance ($Tm^2$) versus channel compares the inventive method with optimization using only the individual and separate optical power monitoring of the first and last fiber in the array (fiber 1 and fiber 8). The improvement of the inventive method is noticeable and represents a gain of about 17% in terms of alignment precision. Such a gain is very beneficial and has a direct impact on the behavior in environmental tests of a circuit component connected to a fiber array, such as specified in Bellcore GR1209 and 1221 requirements regarding thermal cycling and damp heat environmental tests. As shown in FIG. 7, there is some trade off in that some channels are worse and others are better, in that the invention focuses on the total optical power of the fiber array and not the individual optical power of a fiber in the array.

Table I below provides a further comparison of the inventive method versus optimization of coupling and alignment using only the optical power monitoring of the first and last fiber in the array.

TABLE I

| Channel # | Individually and Separately Measured Power (TW) |
|---|---|
| 1 | 11.31 |
| 2 | 10.53 |
| 3 | 11.19 |
| 4 | 10.76 |
| 5 | 12.33 |
| 6 | 10.55 |
| 7 | 13.87 |
| 8 | 11.86 |
| | 92.4  Numerical Total |

The individually and separately measured optical power of channels 1 through 8 in Table I were each measured one at a time after fiber array 22 was aligned and optimally coupled to circuit component 20 using a first optical power sensor to monitor the first fiber in the array and a second optical power sensor to monitor the last fiber in the array. The 92.4 numerical total is just the numerical sum of the eight individually and separately measured optical power values.

The total optical power coupled from circuit component 20 into fiber array 22 (for the connection of the circuit component and fiber array Table I achieved by optimization using the first and last fiber of the array) was measured as 92.2 TW using the apparatus of the invention by inserting the terminal fiber ends 34 into integrating sphere 44. The method and apparatus of the invention was then used to optimize the alignment between the same particular circuit component 20 and fiber array 22 of Table I. The inventive method and apparatus optimized the alignment to provide a maximized total optical power of 99.2 TW. The inventive method provided a total optical power gain of about 7% (7 Tw greater than that achieved by alignment with monitoring the first and last fibers of the array with separate and individual optical power sensors).

The alignment method of the invention provides for optimization of the total optical power of the N fibers of the fiber array by putting the N terminal ends of the N fibers into the integrating sphere. The integrating sphere acquires the sum of the power of each channel and the coupling operation of the fibers in the ribbon is economic in time because one does not need to strip and cleave each fiber of the array, or individually monitor fibers in the array. The inventive method can be used with autoalignment algorithms used for positioning single optical fiber.

It will be apparent to those skilled in the art that various modifications and variations can be made in the methods and apparatus of the present invention without departing from the spirit or scope of the invention. Thus, it is intended that the present invention cover the modifications and variations of this invention provided they come within the scope of the appended claims and their equivalents.

What is claimed is:

1. A method of connecting an integrated optical waveguide circuit component with an optical fiber array, said method comprising the steps of:

providing an integrated optical waveguide circuit component having an array of N waveguide ports;

providing an optical fiber array having an array of N optical fibers, said N optical fibers each having a coupling end for optical coupling to a respective individual corresponding waveguide port of said circuit component, each of said N optical fibers terminating with an individual optical fiber terminal end;

positioning said optical fiber array adjacent to said circuit component, so that a plurality of photons emitted from waveguide ports of said circuit component are coupled into the respective individual corresponding optical fiber coupling ends of the optical fiber array;

positioning the N optical fiber terminal ends of the N optical fibers of the optical fiber array adjacent to an input of an optical power collection and concentrating member which collects a plurality of photons that exit the terminal ends of the N optical fibers and concentrates the plurality of photons on an optical power sensor;

sensing a value representative of the total optical power of the photons concentrated on the optical power sensor, said photons having been emitted from said waveguide ports and coupled into the respective individual corresponding optical fiber coupling ends and exited from the terminal ends of the optical fibers;

adjusting the relevant position of said optical fiber array to said circuit component so that the sensed value representative of the total optical power of the photons is maximized, and securing said position of said fiber array to said circuit component.

2. A method as claimed in claim 1, wherein said optical power collection and concentrating member is a reflective optical power collection and concentrating member.

3. A method as claimed in claim 1, wherein said optical power collection and concentrating member is an integrating sphere.

4. A method as claimed in claim 1, wherein providing an optical fiber array further comprises providing an optical fiber array held in an optical fiber array holder, wherein said coupling ends of the optical fibers are contained by said optical fiber array holder.

5. A method as claimed in claim 4, wherein said optical fiber array is comprised of an optical fiber array ribbon.

6. A method as claimed in claim 5, wherein said optical fiber terminal ends are contained by said optical fiber array ribbon.

7. A method as claimed in claim 4, wherein the step of securing said position of said optical fiber array to said circuit component comprises adhering said optical fiber array holder to said circuit component so as to maintain the maximized sensed value.

8. A method as claimed in claim 3, wherein said integrating sphere has a reflectance of at least 98% for the 1300 nm to 1600 nm wavelength range.

9. A method as claimed in claim 3, wherein said integrating sphere sums the individual optical power emitted from the individual terminal ends of the individual optical fibers of the array.

10. A method as claimed in claim 1, wherein N is at least four.

11. A method as claimed in claim 1, wherein N is at least eight.

12. A method as claimed in claim 1, wherein said circuit component comprises a 1×8 splitter/combiner.

13. A method as claimed in claim 1, wherein said circuit component comprises a planar substrate.

14. A method as claimed in claim 1, wherein said circuit component comprises a wavelength division multiplexer demultiplexer.

15. A method as claimed in claim 1, wherein adjusting the relevant position comprises adjusting the relevant position in two translations and one rotation.

16. A method as claimed in claim 1, wherein the relevant position of said optical fiber array to said circuit component is adjusted with an autoalignment system.

17. A method as claimed in claim 16, wherein said sensed value representative of the total optical power is inputted into said autoalignment system.

18. A method as claimed in claim 17, wherein said autoalignment system adjusts the relevant position of said optical fiber array to said circuit component in at least two translations and at least one rotation based on the sensed value representative of the total optical power that is inputted in the autoalignment system.

19. A method as claimed in claim 3 wherein said fiber terminal ends are inserted into said integrating sphere.

20. An apparatus for coupling an integrated optical waveguide circuit component with a multiple fiber array to provide an optimized optical power coupling between the circuit component and a coupling end of the fiber array, with the fiber array terminating with a terminal end distal from the coupling end, said apparatus comprising:

an autoalignment system, said autoalignment system comprised of a circuit component receiving platform for receiving the circuit component, a fiber array coupling end receiving platform for receiving the coupling end of a fiber array, and a position controller, said position controller for controlling and adjusting the relevant position of the coupling end of a fiber array received by said fiber array coupling end receiving platform to that of a circuit component received by said circuit component receiving platform;

an integrating sphere, said integrating sphere positioned proximate said autoalignment system, said integrating sphere comprised of at least one input port and an optical power sensor, said optical power sensor connected to an input of said position controller, wherein the apparatus is adapted to receive a fiber array having a coupling end, and a terminal end distal from the coupling end such that said coupling end is received by the fiber array coupling end receiving platform, and said terminal end is inputted into said input port of said integrating sphere, such that light emitted from a circuit component received by said circuit component received by said circuit component receiving platform is coupled into the fiber array at the fiber coupling end, said light coupled into the fiber array is emitted from the fiber array terminal end and into the integrating sphere and the total optical power emitted from the fiber array terminal is sensed by said optical power sensor, said optical power sensor inputs said sensed total optical power into the input of said position controller, and said position controller repeatedly adjusts the relevant position of the coupling end of the fiber array to that of the circuit component to obtain the maximum total optical power sensed by said optical power sensor.

21. The apparatus as claimed in claim 20, wherein said input port of said integrating sphere is sized such that the terminal end of a fiber array comprised of at least four optical fibers can be inserted into the integrating sphere.

22. The apparatus as claimed in claim 20, wherein said input port of said integrating sphere is sized such that the terminal end of a fiber array comprised of at least eight optical fibers can be inserted into the integrating sphere.

23. A method of aligning a plurality of first optical fiber ends of an optical fiber array held in an optical fiber array holder with a plurality of optical waveguide interface ports of an integrated optical waveguide circuit component, said method comprising the steps of:

abutting the plurality of first optical fiber ends of the optical fiber array held in the optical fiber array holder to the plurality of optical waveguide interface ports of the integrated optical waveguide circuit component;

connecting an energy source to said integrated optical waveguide circuit so that light is emitted from the plurality of optical waveguide interface ports into the first optical fiber ends abutting said optical waveguide interface ports;

said optical fiber array comprised of a plurality of optical fibers which terminate with a plurality of terminal distal second ends, distal from said first ends, inserting said plurality of terminal distal second ends into an integrating sphere, so that the light emitted from the plurality of terminal distal second ends is collected and spatially integrated;

sensing the total optical power of the collected and spatially integrated light emitted from the plurality of terminal distal second ends inserted into the integrating sphere;

adjusting the relative physical relationship of said plurality of optical waveguide interface ports to said first optical fiber ends abutting said optical waveguide interface ports in order to maximize the sensed total optical power of the collected and spatially integrated light emitted from the plurality of terminal distal second ends inserted into the integrating sphere.

24. A method as claimed in claim 23, wherein said plurality of optical waveguide interface ports of the integrated optical waveguide circuit component is comprised of an array of at least a first waveguide interface port, a second waveguide interface port, a third waveguide interface port, a fourth waveguide interface port, a fifth waveguide interface port, a sixth waveguide interface port, a seventh waveguide interface port and an eighth waveguide interface port, and said plurality of first optical fiber ends of the optical fiber array held in the optical fiber array holder is comprised of a respective matching array of at least a first matching first optical fiber end, a second matching first optical fiber end, a third matching first optical fiber end, a fourth matching first optical fiber end, a fifth matching first optical fiber end, a sixth matching first optical fiber end, a seventh matching first optical fiber end and an eighth matching first optical fiber end, which respectively correspond and match the waveguide interface ports, and said optical fiber array is comprised of at least a first optical fiber which terminates with a first terminal distal second end, a second optical fiber which terminates with a second terminal distal second end, a third optical fiber which terminates with a third terminal distal second end, a fourth optical fiber which terminates with a fourth terminal distal second end, a fifth optical fiber which terminates with a fifth terminal distal second end, a sixth optical fiber which terminates with a sixth terminal distal second end, a seventh optical fiber which terminates with a seventh terminal distal second end and an eighth optical fiber which terminates with an eighth terminal distal second end, wherein sensing the total optical power of the collected and spatially integrated light emitted from the plurality of terminal distal second ends inserted into the integrating sphere comprises sensing the total optical power of the collected and spatially integrated light emitted from said first terminal distal second end, said second terminal distal second end, said third terminal distal second end, said fourth terminal distal second end, said fifth terminal distal second end, said sixth terminal distal second end, said seventh terminal distal second end and said eighth terminal distal second end.

* * * * *